(12) United States Patent
Nakajima

(10) Patent No.: US 10,848,684 B2
(45) Date of Patent: Nov. 24, 2020

(54) IMAGING CONTROL DEVICE, IMAGING CONTROL METHOD, AND IMAGING SYSTEM

(71) Applicant: SONY CORPORATION, Tokyo (JP)

(72) Inventor: Keisuke Nakajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/320,189

(22) PCT Filed: Jul. 6, 2017

(86) PCT No.: PCT/JP2017/024750
§ 371 (c)(1),
(2) Date: Jan. 24, 2019

(87) PCT Pub. No.: WO2018/034076
PCT Pub. Date: Feb. 22, 2018

(65) Prior Publication Data
US 2019/0268524 A1     Aug. 29, 2019

(30) Foreign Application Priority Data
Aug. 16, 2016  (JP) .................................. 2016-159511

(51) Int. Cl.
*H04N 5/235* (2006.01)
*H04N 9/73* (2006.01)
(Continued)

(52) U.S. Cl.
CPC ....... *H04N 5/2357* (2013.01); *H04N 5/23216* (2013.01); *H04N 5/23293* (2013.01);
(Continued)

(58) Field of Classification Search
None
See application file for complete search history.

(56) References Cited

U.S. PATENT DOCUMENTS 8,988,550 B2 * 3/2015 Katagawa ............ H04N 5/2357
                                                                    348/226.1
2009/0135276 A1 * 5/2009 Urisaka ................. H04N 5/235
                                                                    348/241
(Continued)

FOREIGN PATENT DOCUMENTS

JP    2011-010090 A    1/2011
JP    2012-134784 A    7/2012
(Continued)

OTHER PUBLICATIONS

English translation of JP 2015192345A Kitamura (Year: 2015).*
(Continued)

*Primary Examiner* — James M Hannett
(74) *Attorney, Agent, or Firm* — Chip Law Group

(57) ABSTRACT

Provided is an imaging control device including a control unit and a flickering correction unit. The control unit adjusts a parameter of a correction signal for correcting a flickering component included in a captured image before imaging of the captured image starts. The flickering correction unit corrects the flickering component included in the captured image based on the parameter of the correction signal after adjustment.

19 Claims, 15 Drawing Sheets

(51) Int. Cl.
 H04N 9/07 (2006.01)
 H04N 5/232 (2006.01)
 H04N 5/225 (2006.01)
(52) U.S. Cl.
 CPC ............ *H04N 9/07* (2013.01); *H04N 9/735* (2013.01); *H04N 5/22525* (2018.08)

(56) References Cited

U.S. PATENT DOCUMENTS

2011/0255786 A1* 10/2011 Hunter .................. H04N 5/21
 382/190
2012/0002074 A1* 1/2012 Baba .................... H04N 5/235
 348/228.1
2012/0162466 A1 6/2012 Katagawa et al.
2017/0374263 A1* 12/2017 Somayaji .............. G09G 5/026

FOREIGN PATENT DOCUMENTS

JP 2015-192345 A 11/2015
JP 2015192345 A * 11/2015
JP 2016-092786 A 5/2016

OTHER PUBLICATIONS

International Search Report and Written Opinion of PCT Application No. PCT/JP2017/024750, dated Sep. 26, 2017, 09 pages of ISRWO.

* cited by examiner

100

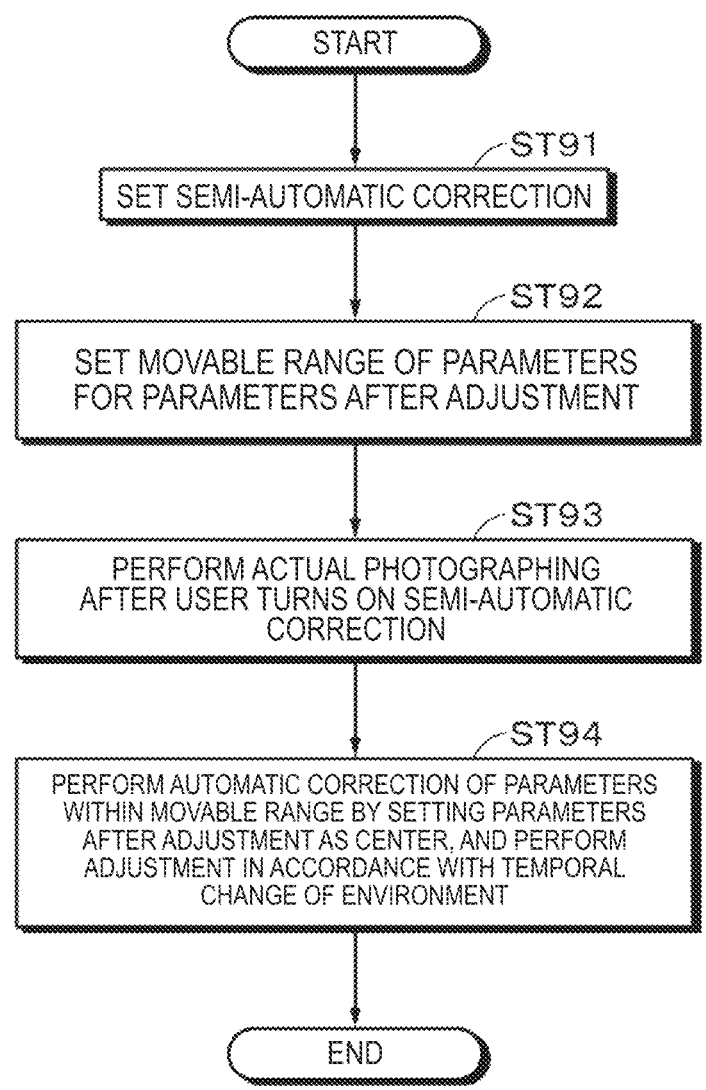

IMAGING CONTROL DEVICE, IMAGING CONTROL METHOD, AND IMAGING SYSTEM

CROSS REFERENCE TO RELATED APPLICATIONS

This application is a U.S. National Phase of International Patent Application No. PCT/JP2017/024750 filed on Jul. 6, 2017, which claims priority benefit of Japanese Patent Application No. JP 2016-159511 filed in the Japan Patent Office on Aug. 16, 2016. Each of the above-referenced applications is hereby incorporated herein by reference in its entirety.

TECHNICAL FIELD

The present technology relates to an imaging control device, an imaging control method, and an imaging system.

BACKGROUND ART

In fluorescent lamps prevalent as indoor light sources, light emitting diodes (LEDs) that have become more common recently, and the like, so-called flickering in which illumination light periodically blinks due to influences of commercial power frequencies occurs. Technologies related to imaging devices for preventing deterioration in image quality such as color unevenness due to such flickering have been proposed (for example, see Patent Literature 1 below).

CITATION LIST

Patent Literature

Patent Literature 1: JP 2004-222228A

DISCLOSURE OF INVENTION

Technical Problem

In such fields, it is preferable to perform effective flickering correction.

An object of the present disclosure is to provide an imaging control device, an imaging control method, and an imaging system capable of performing effective flickering correction.

Solution to Problem

To solve the problem described above, the present disclosure is, for example, an imaging control device including: a control unit that is able to adjust a parameter of a correction signal for correcting a flickering component included in a captured image before imaging of the captured image starts.

In addition, the present disclosure is, for example, an imaging control method including: adjusting, by a control unit, a parameter of a correction signal for correcting a flickering component included in a captured image before imaging of the captured image starts.

In addition, the present disclosure is, for example, an imaging system including: an imaging unit; a control unit that is able to adjust a parameter of a correction signal for correcting a flickering component included in a captured image before imaging of the captured image starts; a flickering correction unit configured to perform correction based on the correction signal on the captured image; and a display unit configured to display the corrected image.

Advantageous Effects of Invention

According to at least one embodiment of the present disclosure, it is possible to perform effective flickering correction. Note that the effect described above is not necessarily limitative and the effects described in the present technology may be achieved. In addition, content of the present technology is not construed to be limited by the exemplified effects.

BRIEF DESCRIPTION OF DRAWINGS

FIG. 15 is a flowchart illustrating a flow of a process in the ninth operation example.

MODE(S) FOR CARRYING OUT THE INVENTION

Hereinafter, embodiments and the like of the present disclosure will be described with reference to the drawings. Note that the description will be made in the following order.
<1. One embodiment>
<2. Modification examples>
The embodiments and the like to be described below are specific preferred examples of the present disclosure and content of the present disclosure is not limited to the embodiments and the like.

1. One Embodiment

Figure 1:
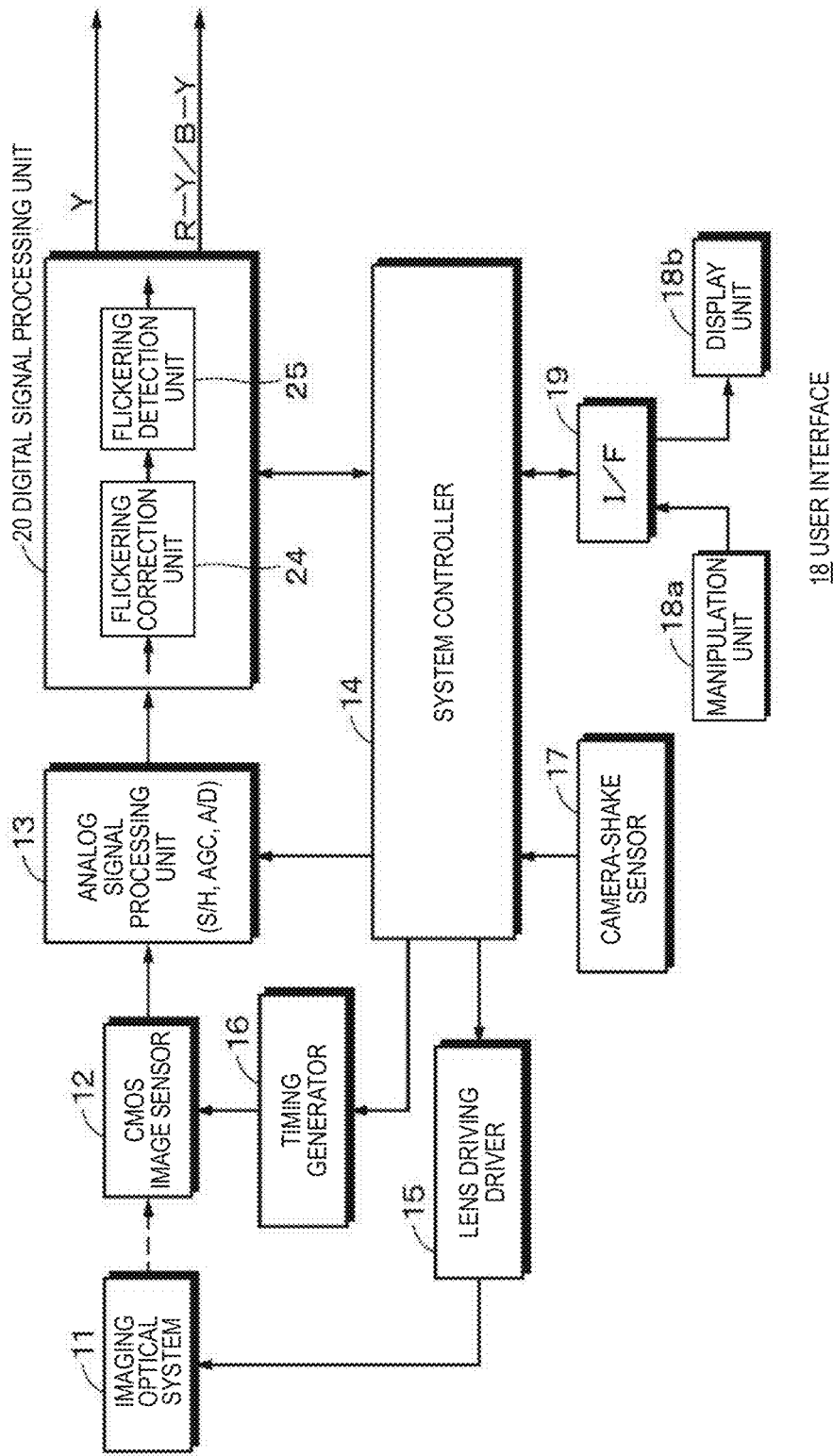
FIG. 1 is a block diagram illustrating a configuration example of an imaging device according to an embodiment of the present disclosure.

[Configuration Example of Imaging Device]
FIG. 1 illustrates a configuration example of an imaging device (an imaging device 100) according to one embodiment of the present disclosure. In the imaging device 100, light from a subject is incident on a complementary metal oxide semiconductor (CMOS) image sensor 12 via an imaging optical system 11 including a lens, a diaphragm, a neural density (ND), and the like. Photoelectric conversion is performed in the CMOS image sensor 12, and thus an analog image signal can be obtained from the CMOS image sensor 12. For example, the imaging optical system 11 and the CMOS image sensor 12 are included in an imaging unit.

In the CMOS image sensor 12, a plurality of pixels including a photodiode (photo-gate), a transmission gate (a shutter transistor), a switching transistor (an address transistor), an amplification transistor, a reset transistor (a reset gate), and the like is arrayed and formed in a 2-dimensional shape, and a vertical scanning circuit, a horizontal scanning circuit, and a video signal output circuit are formed on a CMOS substrate.

The CMOS image sensor 12 may be one of a primary color system and a complementary color system, as will be described below. An analog image signal obtained from the CMOS image sensor 12 is a primary color signal of each color of RGB or a color signal of a complementary color system.

The analog image signal from the CMOS image sensor 12 is sampled and held for each color signal in the analog signal processing unit 13 configured as an integrated circuit (IC), a gain of the analog image signal is controlled through automatic gain control (AGC), and the analog image signal is converted into a digital signal through analog-to-digital (A/D) conversion.

A digital image signal from the analog signal processing unit 13 is supplied to a digital signal processing unit 20 configured as an IC. The digital signal processing unit 20 performs a process to be described below. The digital signal processing unit 20 includes, for example, a flickering correction unit 24 and a flickering detection unit 25. In the digital signal processing unit 20, for example, after a flickering component is corrected for each signal component (color component), signals converted into color difference signals R–Y and B–Y between red and blue, and a luminance signal Y are finally output from the digital signal processing unit 20.

A system controller 14 which is an example of a control unit includes a microcomputer or the like including a read-only memory (ROM), a random access memory (RAM), or the like and controls each unit of the imaging device 100. For example, the system controller 14 sets a correction signal for correcting a flickering component (hereinafter appropriately referred to as a correction signal CS) in the flickering correction unit 24. The system controller 14 can adjust a parameter of the correction signal CS. In addition, the system controller 14 is supplied with a detection result of flickering by the flickering detection unit 25. The system controller 14 performs display control for causing a display unit (a display unit 18*b*) to be displayed below to perform display based on the detection result or the like. Note that a process of correcting flickering means a process of reducing flickering (completely removing flickering depending on a case).

In addition, the system controller 14 supplies a lens driving control signal to the lens driving driver 15 including an IC. In response to the supply of the lens driving control signal, the lens driving driver 15 operates and the lens or the diaphragm of the imaging optical system 11 is driven.

In addition, a timing control signal is supplied from the system controller 14 to a timing generator 16 and various timing signals are supplied from the timing generator 16 to the CMOS image sensor 12 so that the CMOS image sensor 12 is driven.

Further, a detection signal of each signal component is captured from the digital signal processing unit 20 to the system controller 14. The analog signal processing unit 13 controls a gain of each color signal, as described above, with an AGC signal from the system controller 14 and the system controller 14 controls signal processing in the digital signal processing unit 20.

In addition, a camera-shake sensor 17 is connected to the system controller 14 and camera-shake information obtained from the camera-shake sensor 17 is used to correct camera shake.

In addition, in the system controller 14, a manipulation unit 18*a* and a display unit 18*b* included in a user interface 18 are connected via an interface (I/F) 19 and a setting manipulation, a selection manipulation, or the like in the manipulation unit 18*a* are detected by the system controller 14. In addition, a screen for setting a camera, a screen indicating a control state, or the like is displayed as a menu screen or the like on the display unit 18*b* under the control of the system controller 14. Note that the display unit 18*b* may include a touch panel and function as the manipulation unit 18*a*.

Note that the imaging device 100 may include a storage device. The storage device may be a device such as a hard disk contained in the imaging device 100 or may be a memory such as a Universal Serial Bus (USB) memory which is detachably mounted on the imaging device 100. In addition, the imaging device 100 may include a communication device. Image data, various kinds of setting data, and the like may be transmitted to and received from an external device via the Internet or the like using the communication device. Communication may be performed as wired communication or may be performed as wireless communication.

"Configuration Example of Digital Signal Processing Unit"

Figure 2:
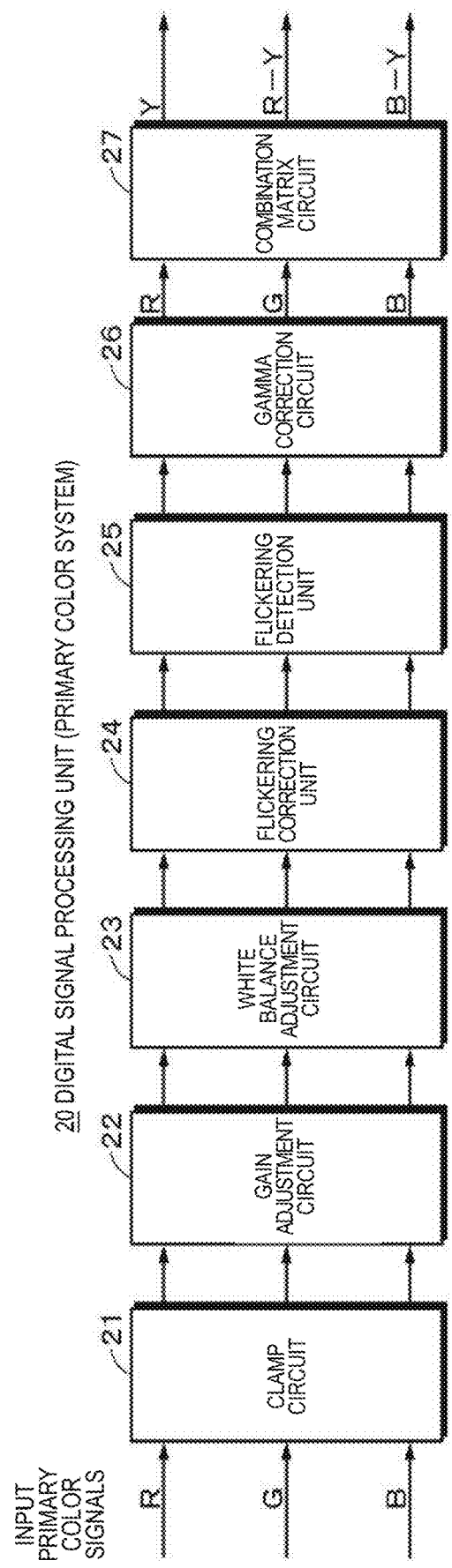
FIG. 2 is a block diagram illustrating a configuration example of a digital signal processing unit according to an embodiment of the present disclosure.

FIG. 2 is a block diagram illustrating a configuration example of the digital signal processing unit 20 in the case of a primary color system. The primary color system is a three-plate system in which the imaging optical system 11 in FIG. 1 includes a separation optical system that separates light from a subject into color light with respective colors of RGB and a CMOS image sensor for each color of RGB as the CMOS image sensor 12 or a one-plate system in which one CMOS image sensor in which color filters of respective colors of RGB are arranged sequentially and repeatedly for each one pixel in a screen-horizontal direction on a light incidence surface is included as the CMOS image sensor 12. In this case, RGB primary color signals are read in parallel from the CMOS image sensor 12.

In the digital signal processing unit 20 in FIG. 2, a clamp circuit 21 clamps a black level of the input RGB primary color signals to a predetermined level, a gain adjustment circuit 22 adjusts gains of the RGB primary color signals after the clamping in accordance with an exposure amount. A white balance adjustment circuit 23 adjusts white balance of RGB primary color signals after gain adjustment. The flickering correction unit 24 performs flickering correction based on the correction signal CS to correct flickering components included in the RGB primary color signals after the white balance adjustment. The flickering detection unit 25 detects the flickering components included in an image after the flickering correction. A detection result is supplied to, for example, the system controller 14.

A gamma correction circuit 26 converts gray scales of the RGB primary color signals after the correction and the detection of the flickering components and a combination matrix circuit 27 generates the luminance signal Y and the color difference signals R−Y and B−Y of an output from the RGB primary color signals after the gamma correction.

In the primary color system, as illustrated in FIG. 2, the luminance signal Y is generally generated after all the processes for the RGB primary color signals end. Therefore, as illustrated in FIG. 2, by correcting flickering components in the RGB primary color signals during the processes of the RGB primary color signals, it is possible to sufficiently correct the flickering components of each color component and luminance component together.

Note that, in the example illustrated in FIG. 2, the flickering component is corrected for each primary color signal of the RGB colors. However, the flickering component in the luminance signal Y may be configured to be corrected instead.

On the other hand, a complementary color system is a one-plate system that includes one CMOS image sensor in which color filters of a complementary system are formed on a light incidence surface as the CMOS image sensor 12 in FIG. 1.

In the complementary color system, video signals at two adjacent horizontal line positions are combined and read from the CMOS image sensor 12. The digital signal processing unit 20 clamps a black level of a complementary signal (a synthesized signal) at a predetermined level, adjusts a gain of the complementary signal after the clamping in accordance with an exposure amount, and further generates a luminance signal and RGB primary color signals from the complementary signal after adjustment of the gain. The other processes are the same as the above-described processes.

"Flickering"

Next, for making easier to understand the present disclosure, an example of a flickering component occurring due to a fluorescent lamp or the like in an NTSC system will be described to facilitate understanding. Note that in this example, a case in which a frame rate is set to 60 frames per second (fps) and a commercial power frequency is set to 50 hertz (Hz) will be described. Characteristics of the flickering component occurring in this case are as follows:

(1) generated by 5/3 periods in one screen (3 frames (which may be fields) are set as a repetition period);

(2) a phase is changed for each line; and (3) handled as a sinusoidal wave with a frequency (100 Hz) which is twice the commercial power frequency (50 Hz).

Figure 3:
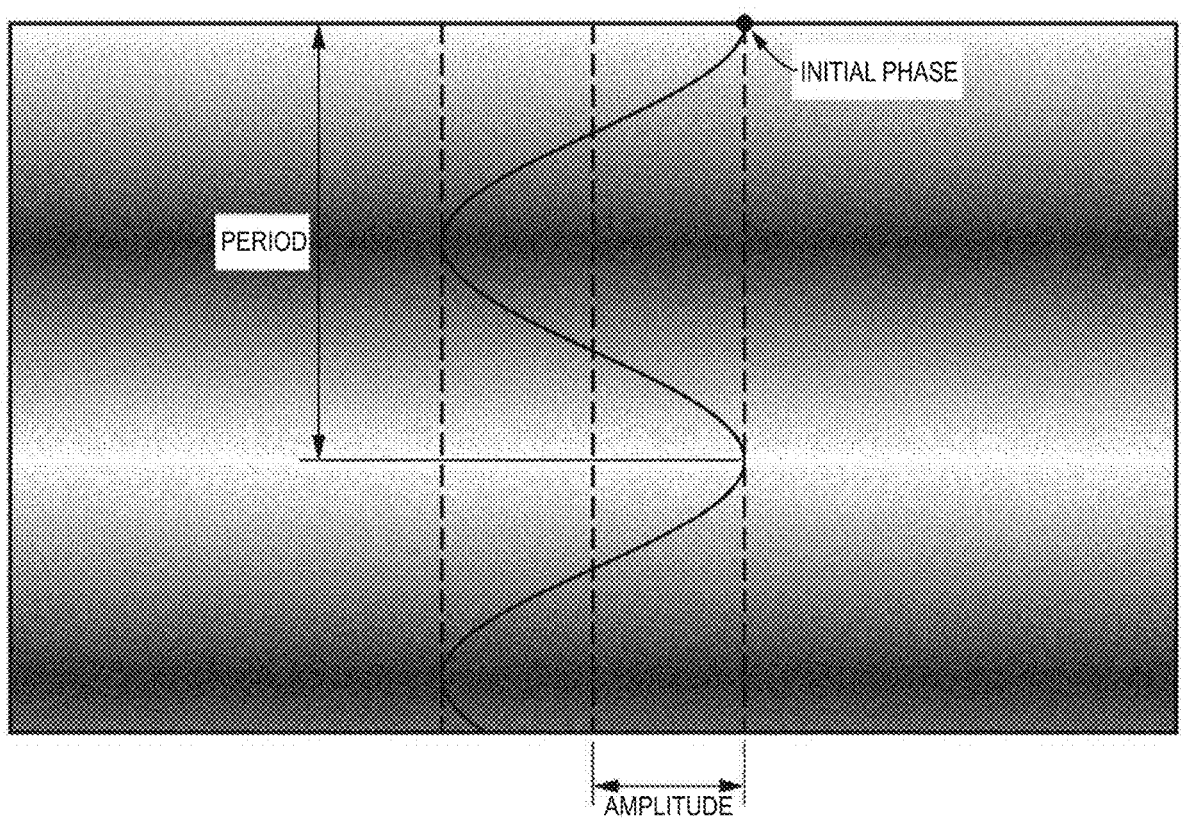
FIG. 3 is a diagram illustrating an example of a flickering component.

From the foregoing characteristics, a flickering component is generated, as illustrated in FIG. 3, when a flickering phenomenon occurs. Note that scanning is assumed to be performed from the upper side (the upper portion of the screen) to the lower side (the lower portion of the screen) in FIG. 3. In the CMOS image sensor 12, since an exposure timing differs for each horizontal line, an amount of received light is changed in accordance with the horizontal line. Accordingly, although the fluorescent lamp or the like illuminates uniformly spatially, there are a horizontal line with a value of a video signal greater than an average value and a horizontal line with a value of a video signal less than the average value as in FIG. 3. For example, in the frames of FIG. 3, a flickering component (an amplitude of the flickering component) in the highest horizontal line in the image, that is, a head line, has the highest peak. Further, in a horizontal line shifted from the head line by lines equivalent to 3/5 of the total number of lines included in one screen, a flickering component is also the highest. In this way, the flickering component can be expressed as a sine function (sinusoidal wave) that has an amplitude, a period, and an initial phase, as illustrated in FIG. 3. Note that in this example, the initial phase means a phase in the head line.

Further, the phase of each horizontal line changes in accordance with a frame. That is, a horizontal line with a value of a video signal greater than the average value and a horizontal line with a value of a video signal less than the average value are changed for each frame. In a subsequent frame, a sinusoidal wave with a different initial phase is formed. For example, when flickering in the fluorescent lamp is generated at 100 Hz and a frame rate is 60 fps, 5 periods of the flickering in the fluorescent lamp are a time equivalent to 3 frames. Accordingly, the initial phase is the same phase every 3 frames. In this way, the flickering component is changed in accordance with the horizontal line and the frames. Note that in the case of a PAL scheme, that is, a case in which the frame rate is 50 fps and the commercial power frequency is 60 Hz, the flickering component can be expressed as a sinusoidal wave that has a period of 5 frames.

As a technology for correcting the flickering components, a technology disclosed in the above-described Patent Literature 1 or the like has been proposed. For example, by detecting a flickering component that can be expressed by a sin function and multiplying an inverse gain and a phase inverted from the gain of the flickering component, it is possible to correct the flicker component theoretically.

In general, a process of correcting the flicker component is automatically performed on an imaging device side. This function is convenient, but there is concern of erroneous correction in which a component which is not a flickering component is corrected as the flickering component or conversely deterioration in image quality due to overcorrection of a flickering component. In addition, in consideration of this point, a flickering component is allowed to remain in a flickering correction process in some cases.

As described above, a flickering component can definitely be treated as a sinusoidal wave with a frequency of 100 Hz (in the case of a commercial power frequency (50 Hz)) theoretically. In practice, there is temporal fluctuation (jitter) of a flickering component due to a change in a power voltage, a variation or the like in quality, or the like. Characteristics of the flickering component can also be the above-described erroneous correction or a cause of the overcorrection.

In addition, high frame rate (HFR) photographing has recently become prevalent. In the high frame rate photographing, however, cases in which an influence of the flickering is not sufficiently reduced occur frequently. Thus, it is preferable to improve flickering correction at the time of the high frame rate photographing. In addition, for example, for high-end users that deal with high-performance imaging devices, means for efficiently realizing the flickering correction is preferable even if the means is not fully automatic flickering correction. In view of such points, a plurality of operation examples of the imaging device 100 according to the present disclosure will be described.

Note that the imaging device 100 may be configured to perform a process based on one operation example among the plurality of operation examples to be described below, may be configured to be able to perform a process based on all the operation examples, or may be configured to be able to select some of the operation examples as a mode and perform a process corresponding to the selected mode.

First Operation Example

Figure 4:
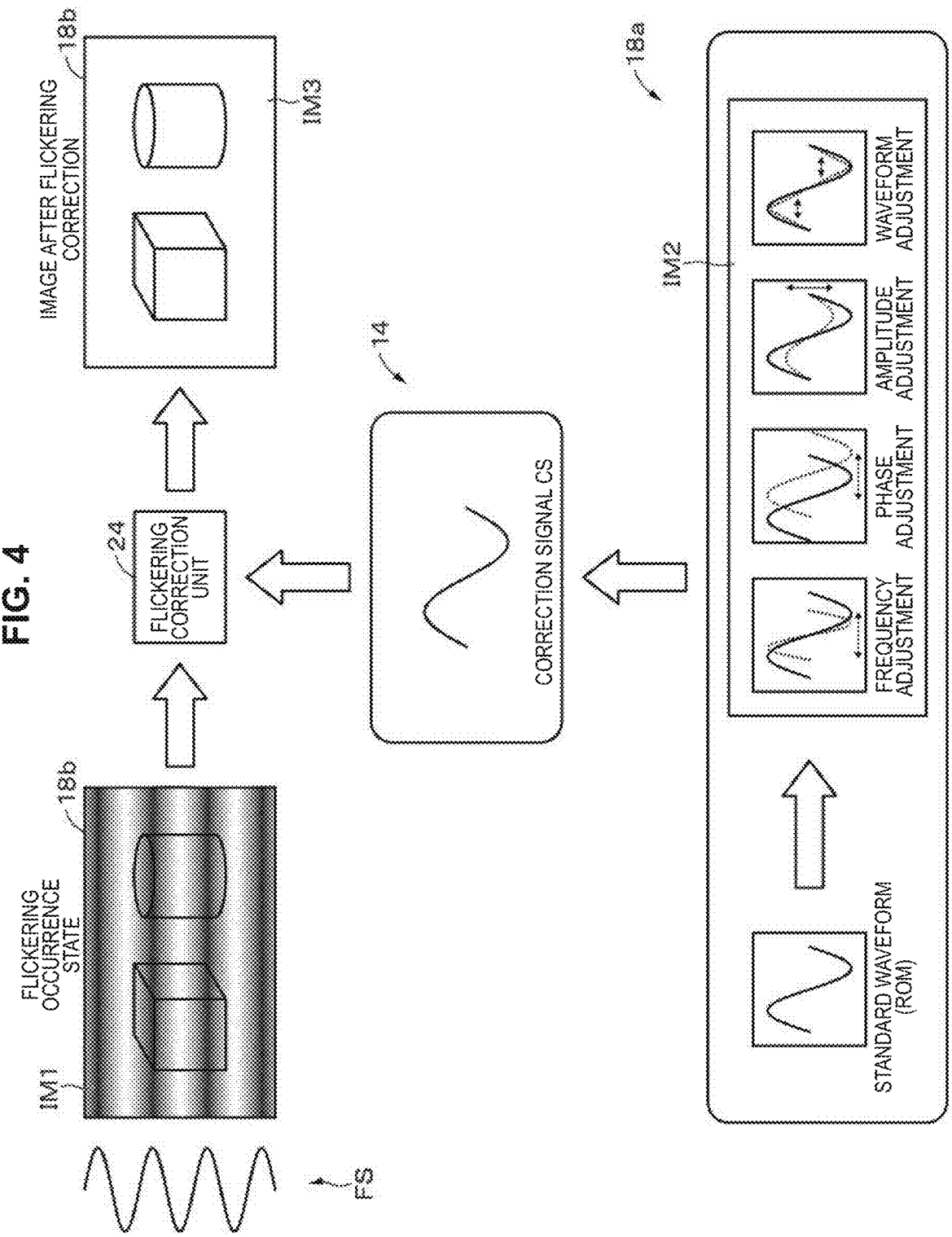
FIG. 4 is an explanatory diagram illustrating a first operation example.

Hereinafter, the plurality of operation examples of the imaging device 100 will be described. FIG. 4 is an explanatory diagram schematically illustrating a first operation example of the imaging device 100. The first operation example is an example in which a parameter of the correction signal CS for flickering correction is adjusted through a manual manipulation. The parameter of the correction signal CS is at least one of a frequency, a phase, an amplitude, or a waveform shape of the correction signal CS. In the present specification, all of these parameters are used as parameters.

As illustrated in FIG. 4, the display unit 18*b* displays, for example, a through image obtained via the imaging optical system 11, the CMOS image sensor 12, and the like. Here, since the imaging device 100 is assumed to be used under a flickering light source, the display unit 18*b* displays an image IM1 that includes flickering components. Note that a waveform illustrated in the vicinity of the image IM1 schematically indicates a waveform FS of the flickering component. The waveform FS may be displayed or may not be displayed on the display unit 18*b*.

The ROM included in the system controller 14 stores a standard waveform. The standard waveform has, for example, one period of an inverse gain signal for correcting a flickering component with a representative frequency (100 Hz or 120 Hz). The standard waveform is displayed in an image IM2 which is an adjustment screen for adjusting the parameters and various parameters are adjusted on the basis of the reference waveform. For example, as illustrated in FIG. 4, the standard waveform is displayed for each parameter. Note that the image IM2 for adjusting the parameters may be displayed on the display unit 18*b* along with the image IM1.

A user selects adjustment target parameters using the manipulation unit 18*a* and subsequently adjusts the parameters using the manipulation unit 18*a*. For example, the user raises a frequency of the correction signal CS, advances a phase of the correction signal CS, or increases or decreases an amplitude of the correction signal CS. Alternatively, the user also may adjust the waveform shape of the standard waveform. A manipulation signal for adjusting the parameters is supplied from the manipulation unit 18*a* to the system controller 14.

The system controller 14 generates the correction signal CS for the flickering correction on the basis of the manipulation signal. That is, the correction signal CS with the frequency or the like after the adjustment is generated by the system controller 14. The system controller 14 sets the generated correction signal CS in the flickering correction unit 24. The flickering correction unit 24 corrects a flickering component by multiplying the flickering component by the correction signal CS. An image IM3 in which the flickering is corrected after the flickering correction is displayed on the display unit 18*b*.

Note that the image IM3 in which the flickering is removed after the flickering correction is illustrated in FIG. 4, but the flickering appears to remain in the image IM3 in which the flickering is removed after the flickering correction depending on precision of the adjustment. In this case, the parameters of the correction signal CS may be adjusted again and flickering correction in which the correction signal CS based on the parameters after the adjustment is used may be performed.

Figure 5:
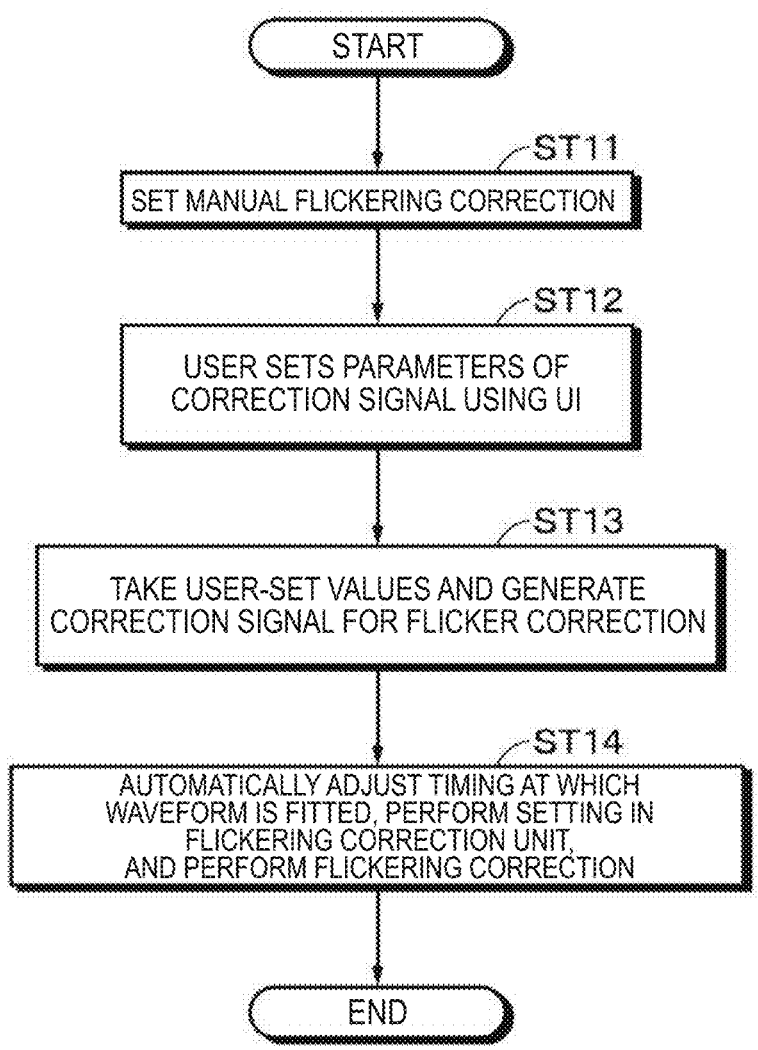
FIG. 5 is an explanatory flowchart illustrating a flow of a process in the first operation example.

FIG. 5 is an explanatory flowchart illustrating a flow of a process in the first operation example. Note that the process to be described below is performed in a preparation stage preceding actual photographing (before the imaging starts). The actual photographing is photographing in which captured images obtained by photographing a subject are recorded (videotaped) on a recording medium for reserving the captured images. Here, the recording medium may be contained in the imaging device 100, may be detachably mounted on the imaging device 100, or may be separate from the imaging device 100 (for example, a memory in a cloud space). The captured images may be a video or may be still images. In addition, the preparation stage is, for example, a stage before a manipulation of instructing the actual photographing (for example, a manipulation of half pressing or fully pressing a shutter button) is performed after an image of the subject scheduled to be imaged is accepted via the imaging optical system 11.

When the process starts, a mode in which the parameters of the correction signal CS for correcting the flickering component (manual flickering correction) are adjusted through a manual manipulation is set in step ST11. Then, the process proceeds to step ST12.

In step ST12, the user sets the parameters of the correction signal CS for correcting the flickering component using a predetermined user interface (UI). Note that any UI can be used and this example is illustrated in FIG. 4 described above. Then, the process proceeds to step ST13.

In step ST13, set values of the parameters set in step ST12 are accepted by the system controller 14. The system controller 14 generates the correction signal CS based on the set values of the parameters. Then, the process proceeds to step ST14.

In step ST14, a timing at which the waveform is fitted is automatically adjusted by the system controller 14. Then, the correction signal CS is set in the flickering correction unit 24 and the flickering correction is performed by multiplying the flickering component by the correction signal CS even at the adjusted timing. The image after the flickering correction is performed is displayed on the display unit 18*b*. After the parameters of the correction signal CS are adjusted, the flickering correction by the correction signal CS is performed on the captured image obtained through the actual photographing (the same applies to the other operation examples).

In the above-described first operation example, it is possible to adjust the parameters of the correction signal for correcting the flickering components included in a captured image before the imaging of the captured image starts. Thus, even in a case in which the fluctuation of the flicker components caused due to a change in the power voltage or the like occurs, the correction signal based on the appropriate parameters can be generated. In addition, since the image after the flickering correction is displayed, whether the adjustment of the parameters is appropriate can be checked.

Second Operation Example

Figure 6:
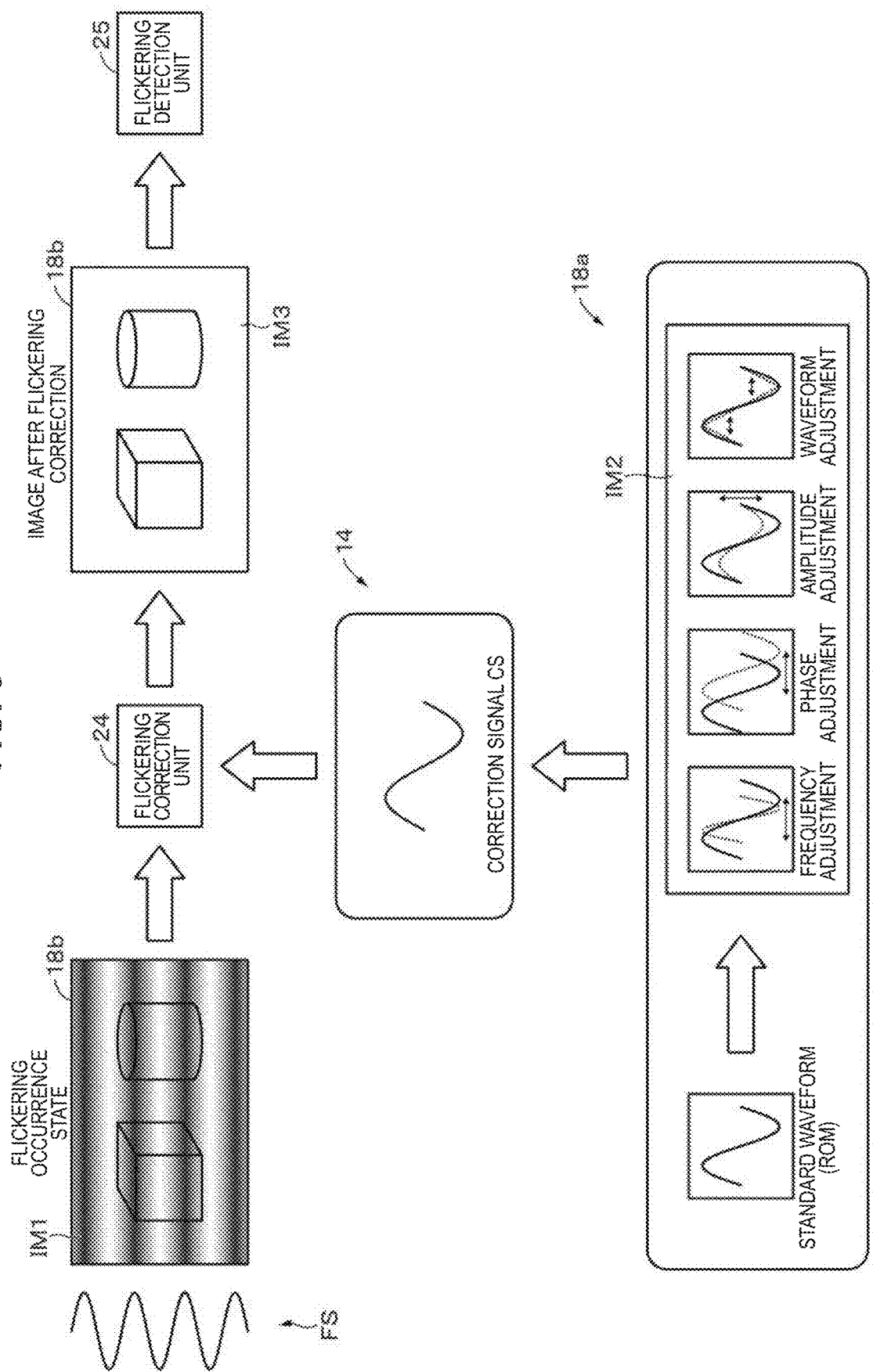
FIG. 6 is an explanatory diagram illustrating a second operation example.

Next, a second operation example of the imaging device 100 will be described. FIG. 6 is an explanatory diagram schematically illustrating the second operation example of the imaging device 100. In the second operation example, after the parameters of the correction signal CS for the flickering correction are adjusted through a manual manipulation as in the first operation example, the flickering correction unit 24 performs a flickering correction process by the correction signal CS. In the second operation example, further, the flickering components included in the image IM3 after the flicker correction are detected and display based on the detection result is displayed on the display unit 18*b*.

A known method can be applied as a process of detecting the flickering components. For example, the method disclosed in Patent Literature 1 can be applied. To roughly describe this method, an average value of integrated values in the number of fields (for example, three consecutive fields) corresponding to a period of a flickering component is calculated and the integrated values are normalized with the average value. Then, a discrete Fourier transform (DFT) is performed on the normalized integrated values and the flickering component is extracted on the basis of a spectrum extracted by the discrete Fourier transform.

A detection result of the flickering component by the flickering detection unit 25 is supplied to the system controller 14. The system controller 14 calculates the degree of deviation between a parameter set through the manual manipulation and an appropriate parameter on the basis of the detection result and performs control such that the degree of deviation is displayed. For example, the system controller 14 generates display data indicating the degree of deviation and performs control such that the display data is displayed on the display unit 18*b* via the I/F 19. Note that the degrees of deviation include a case in which there is no deviation (the degree of deviation is 0).

Figure 7:
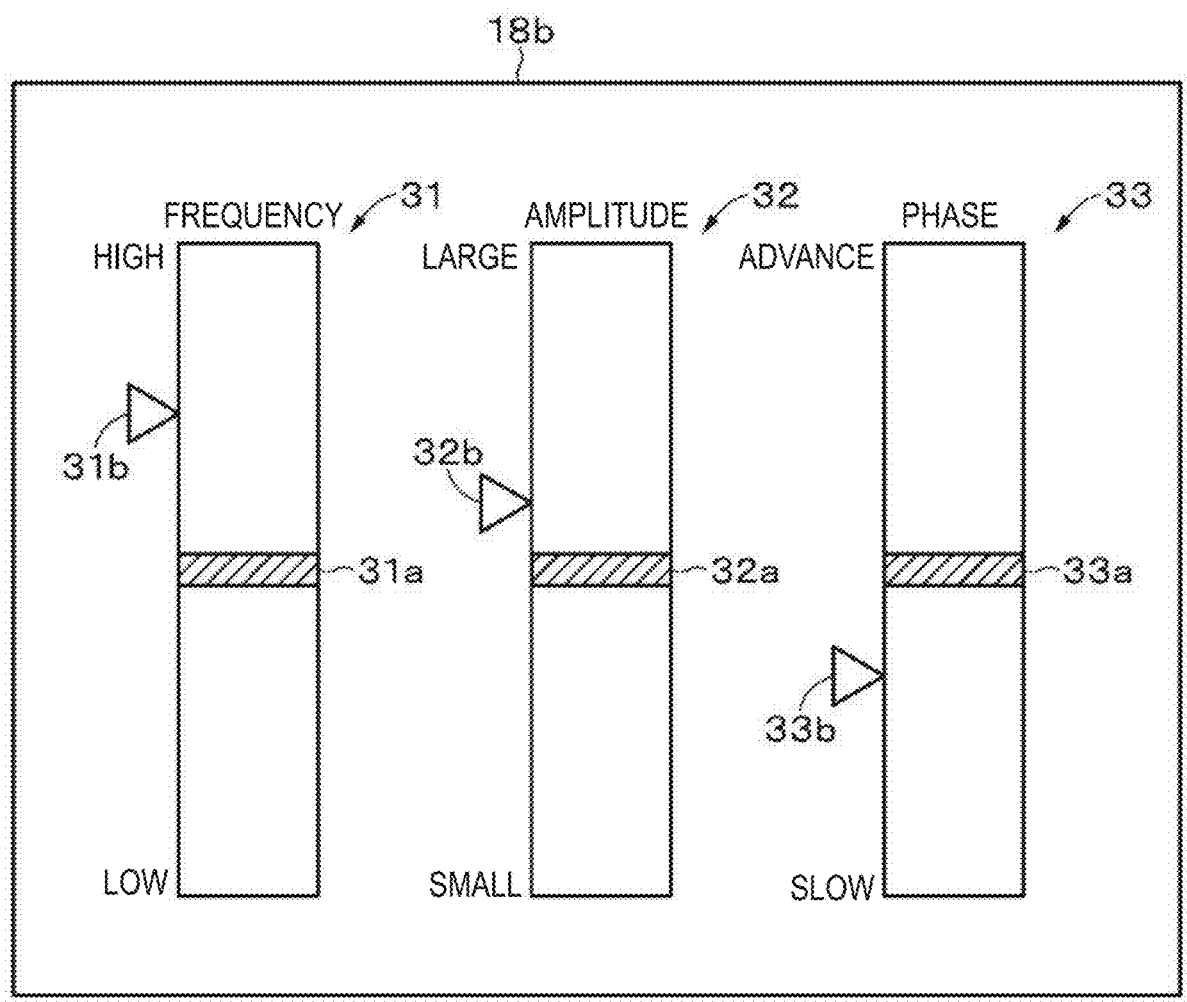
FIG. 7 is an explanatory diagram illustrating a display example indicating the degree of deviation between a parameter after adjustment and an appropriate value.

FIG. 7 illustrates an example of a screen showing the degree of deviation displayed on the display unit 18*b* under the control of the system controller 14. For example, the display unit 18*b* displays rod-like bars 31, 32, and 33 corresponding to parameters of a frequency, an amplitude, and a phase. Middle portions 31*a*, 32*a*, and 33*a* of the bars indicate set values of the appropriate parameters. Triangular icons 31*b*, 32*b*, and 33*b* are shown on the left sides of the bars and these icons indicate set values of the parameters set through the manual manipulation. It is sufficient if a user checks the degree of deviation displayed on the display unit 18*b* and performs adjustment again so that the parameters become appropriate values. For example, by vertically moving the icon 31*b* or the like, it is possible to perform readjustment of the parameters. Note that the degree of deviation may be display of letters or the like or the degree of deviation may be reported by a sound.

Figure 8:
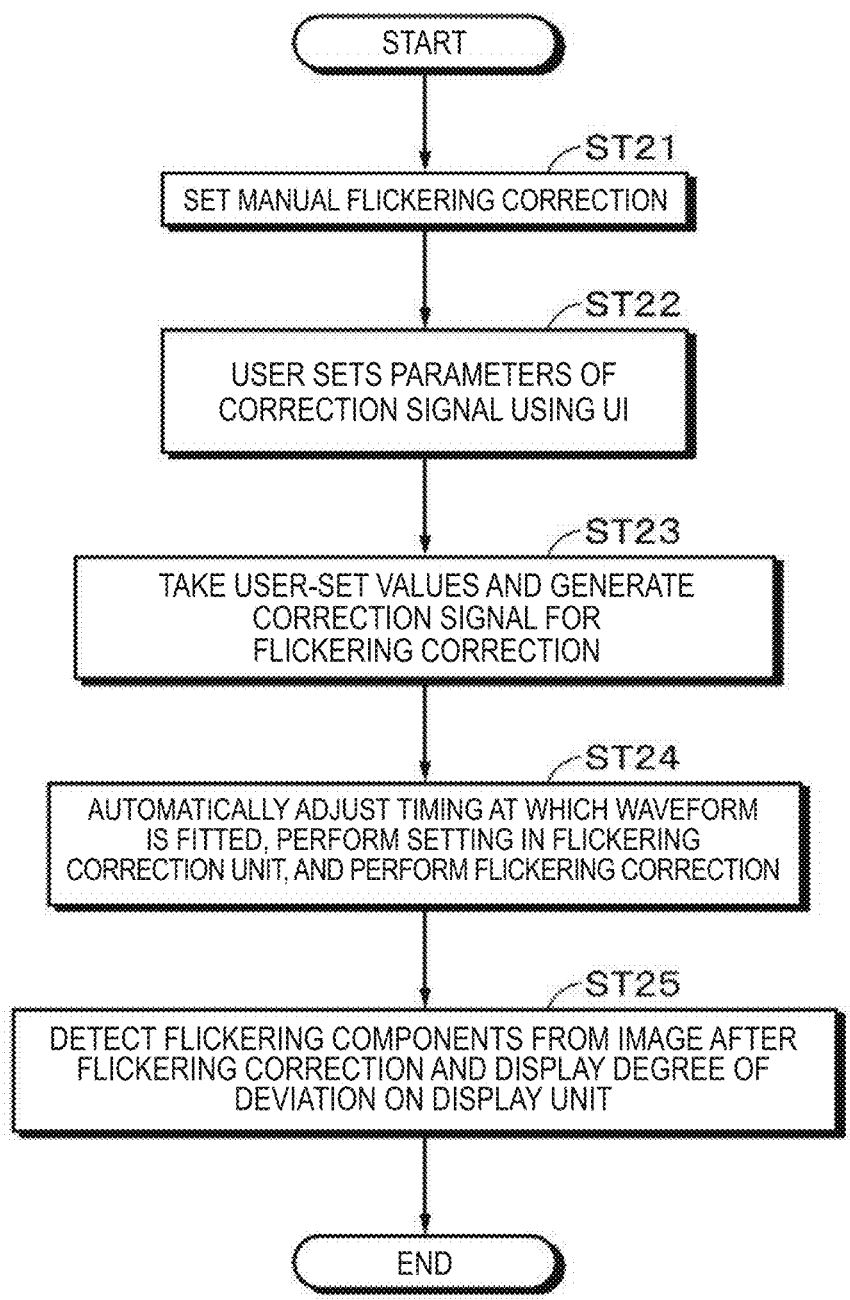
FIG. 8 is a flowchart illustrating a flow of a process in the second operation example.

FIG. 8 is a flowchart illustrating a flow of a process in the second operation example. Note that, in the process to be described below, a preparation stage preceding the actual photographing (a stage before the imaging starts) is performed. Since the processes of steps ST21 to ST24 are the same as the processes of steps ST11 to ST14 described with reference to FIG. 5, the repeated description will be omitted.

After the process of step ST24, the process proceeds to step ST25. In step ST25, the flickering components included in the image after the flickering correction are detected by the flickering detection unit 25 and the detection result is supplied to the system controller 14. The system controller 14 performs control such that the degree of deviation between the parameters set through the manual manipulation and the appropriate parameters is displayed on the display unit 18*b* on the basis of the detection result. Then, a manipulation of adjusting the parameters of the correction signals CS again is performed as necessary.

In the above-described second operation example, the same advantageous effects as the advantageous effects exemplified in the first operation example can be obtained. In addition, in the second operation example, since the display or the like of the degree of deviation between the parameters set through the manual manipulation and the appropriate parameters is reported to the user, it is easy to adjust the parameters.

Third Operation Example

Figure 9:
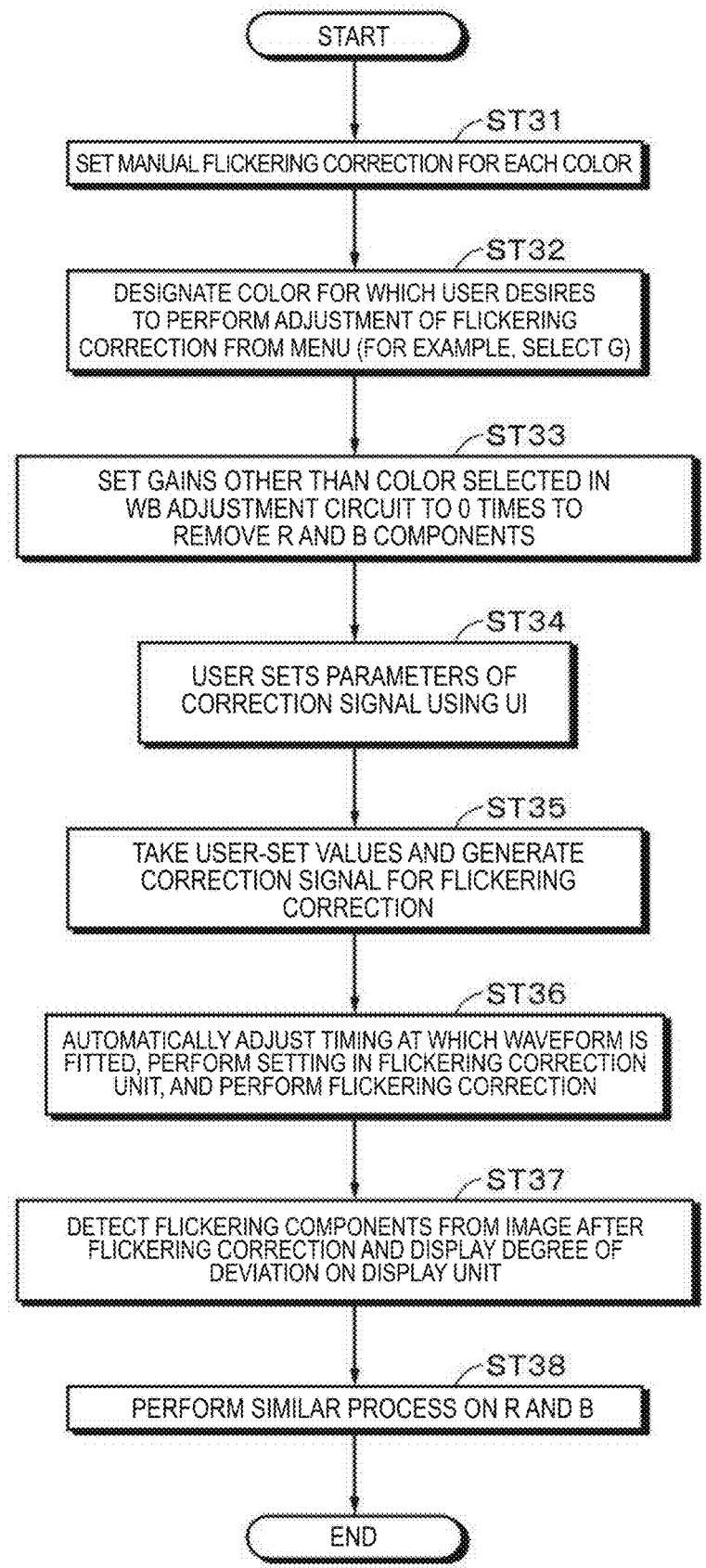
FIG. 9 is a flowchart illustrating a flow of a process in the third operation example.

Next, a third operation example will be described. The third operation example is an example in which the parameters of the correction signal CS can be adjusted for each color. FIG. 9 is a flowchart illustrating a flow of a process in the third operation example. Note that the process to be described below is performed at the preparation stage preceding the actual photographing (the stage before the imaging starts). When the process starts, a mode in which the parameters of the correction signal CS for correcting the flickering components are adjusted for each color through a manual manipulation (manual flickering correction for each color) is set in step ST31. Then, the process proceeds to step ST32.

In step ST32, the user selects a color for which the user desires to perform adjustment of the flickering correction. For example, the user uses a menu screen to select the color for which the user desires to perform the adjustment of the flickering correction. In this example, the G component is selected among the RGB components. Then, the process proceeds to step ST33.

In step ST33, gains of the color components (in this example, R and B) other than the color component selected in the white balance adjustment circuit 23 under the control of the system controller 14 are set to 0 times to remove the R and B components from an image signal. Then, the process proceeds to step ST34.

Since the processes of steps ST34 to ST37 are the same as the processes of steps ST22 to ST25 described with reference to FIG. 8, the repeated description will be omitted. Then, the process proceeds to step ST38.

In step ST38, processes similar to the processes of steps ST31 to ST37 are also performed on the R and G components which are color components other than the G component. Note that, as in the first operation example, the process of displaying the degree of deviation in step ST37 may not be performed.

In the above-described third operation example, it is possible to obtain advantageous effects similar to the advantageous effects exemplified in the second operation example. In addition, in the third operation example, it is possible to set the parameters of the correction signal for each color component of an image.

Fourth Operation Example

Figure 10:
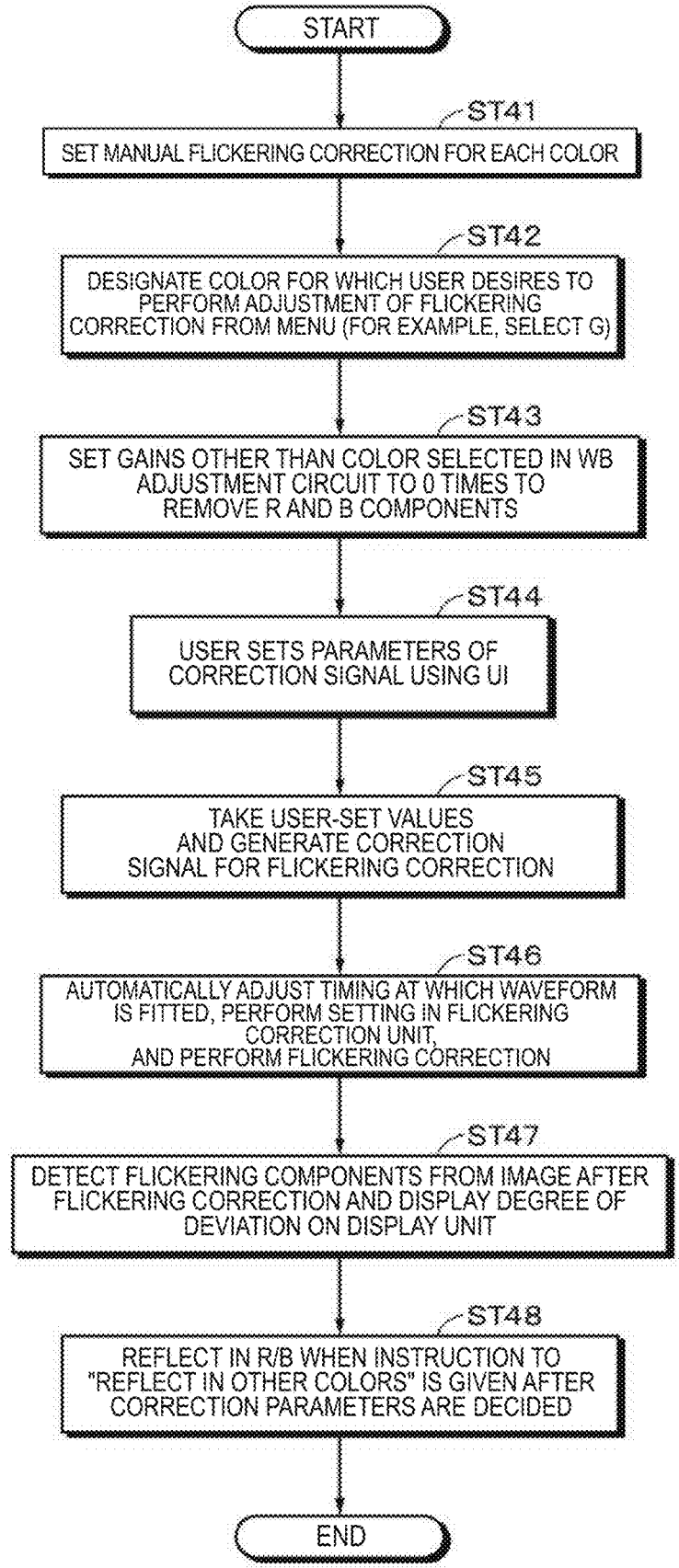
FIG. 10 is a flowchart illustrating a flow of a process in the fourth operation example.

Next, a fourth operation example will be described. The fourth operation example is an example in which content of some of the processes in the third operation example is changed. FIG. 10 is a flowchart illustrating a flow of a process in the fourth operation example. Note that the process to be described below is performed at the preparation stage preceding the actual photographing (the stage before the imaging starts).

Since the processes of steps ST41 to ST47 are the same as the processes of steps ST31 to ST37 described in the third operation example, the repeated description will be omitted. After the process of step ST47, the process proceeds to step ST48.

In step ST48, after the parameters of the correction signal CS are adjusted, an instruction for reflecting the adjusted values in the parameters related to the other color components is given. This instruction is given using, for example, the manipulation unit 18*a*. A manipulation signal in accordance with the instruction manipulation is input to the system controller 14 via the I/F 19. The system controller 14 performs a process of performing setting so that the parameters of the correction signal CS for other color components (in this example, the R and B components) are the same as the parameters as the correction signal CS for the G component in accordance with the manipulation signal.

In the above-described fourth operation example, it is possible to obtain advantageous effects similar to the advantageous effects exemplified in the third operation example. In addition, in the fourth operation example, after the parameters of the correction signal for a certain color component are set, the parameters can be reflected in the parameters of the correction signals for the other color components. For example, the parameters of the correction signal for a color component included most in the image can be set as an adjustment target and the parameters after the adjustment can be reflected in the parameters of the correction signal for the other color components. Thus, it is possible to appropriately adjust the parameters of the correction signal in accordance with the color components included in the image.

Fifth Operation Example

Figure 11:
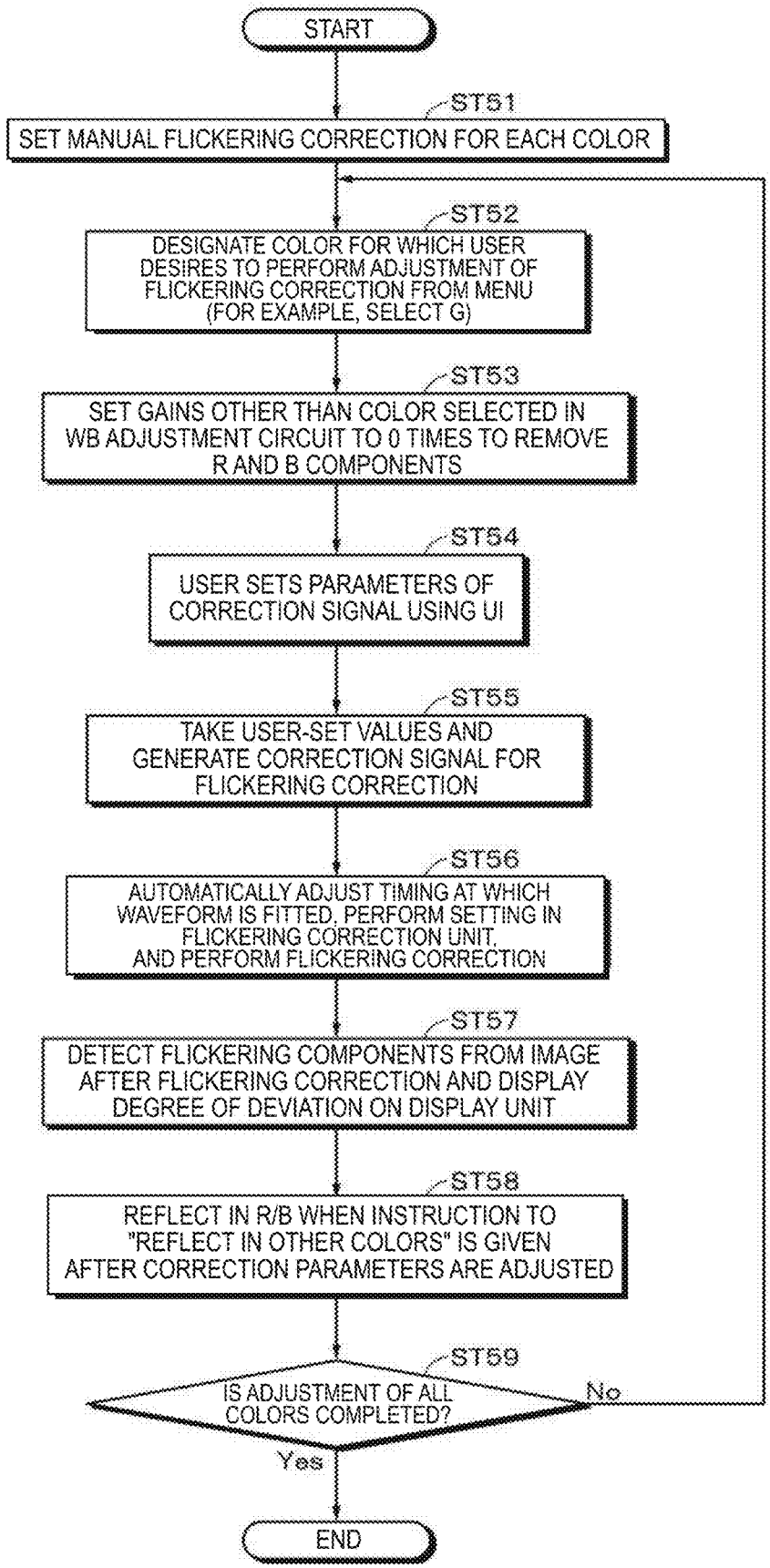
FIG. 11 is a flowchart illustrating a flow of a process in the fifth operation example.

Next, a fifth operation example will be described. The fifth operation example is an example in which content of some of the processes in the fourth operation example is changed. FIG. 11 is a flowchart illustrating a flow of a process in the fifth operation example. Note that the process to be described below is performed at the preparation stage preceding the actual photographing (the stage before the imaging starts).

Processes of step ST51 to ST58 are the same as the processes of steps ST41 to ST48 described in the fourth operation example. That is, the parameters of the correction signal CS for the G component are set as the parameters of the correction signal CS for the R and B components. After the process of step ST58, the process proceeds to step ST59.

In the fifth operation example, the parameters of the correction signal CS for the R and B components can be set to be adjustable using the parameters of the correction signal CS for the G component as a standard. That is, in step ST59, whether or not the parameters of the correction signal CS for all the color components are adjusted is determined. In this example, whether or not the parameters of the correction signal CS for the R and B components are adjusted is determined. In a case in which the determination of step ST59 is Yes, the process ends.

In a case in which the determination of step ST59 is No, the process returns to, for example, step ST52. Then, the processes of steps ST52 to ST58 are repeated, the parameters of the correction signal CS for the R and B components are adjusted, and the determination process of step ST59 is performed again. Note that in a case in which the processes of steps ST52 to ST58 are repeated, the process of step ST58 may be skipped. For example, a process of reflecting the parameters of the correction signal CS for the R component in the parameters of the correction signal CS for the G component or the like may be performed.

In the above-described fifth operation example, it is possible to obtain advantageous effects similar to the advantageous effects exemplified in the fourth operation example. The flickering component is not greatly different for each color component, but there is a minute difference in some cases. Even in this case, since the parameters can be adjusted for each color component in the fifth operation example, countermeasures can be taken. Further, since the parameters of the correction signal for the other color components are adjusted using the parameters of the correction signal for a predetermined color adjusted once as a standard, the parameters can be adjusted simply compared to setting of the parameters of the correction signal CS for all the color components from the beginning.

Sixth Operation Example

Figure 12:
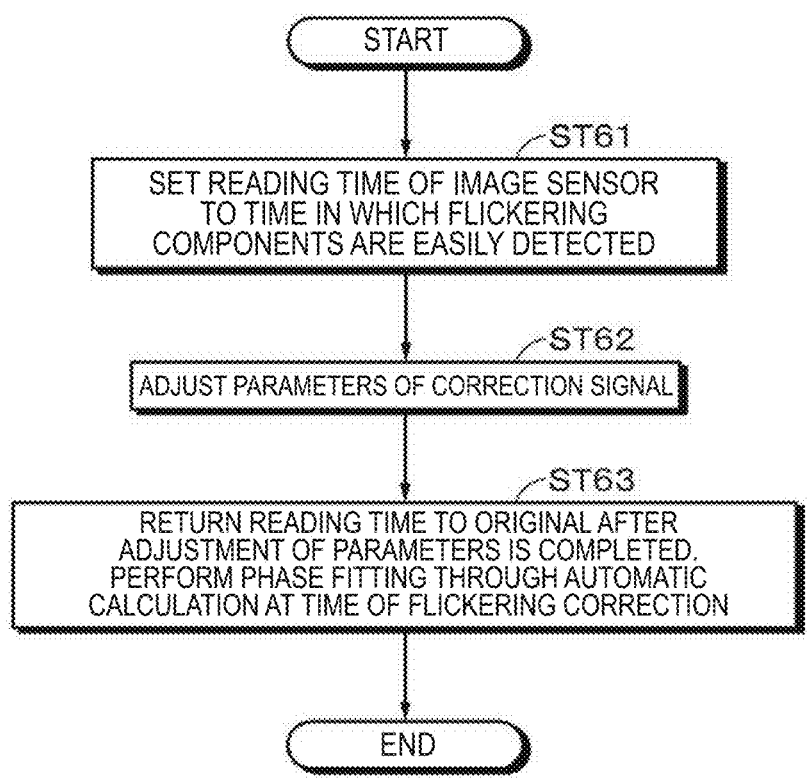
FIG. 12 is a flowchart illustrating a flow of a process in the sixth operation example.

Next, a sixth operation example will be described. FIG. 12 is a flowchart illustrating a flow of a process in the sixth operation example. In the sixth operation example, control in which a frame rate is changed before and after the imaging of the actual photographing starts is performed. Note that in the following description, a reading speed (frame rate) of the CMOS image sensor 12 in the actual photographing will be described as a high speed (for example, 200 fps, 240 fps, 400 fps, 480 fps, or the like).

In step ST61, at the preparation stage preceding the actual photographing (the stage before the imaging starts), a reading speed of the CMOS image sensor 12 is set to a speed (for example, 60 fps or 50 fps) at which the flickering components are easily detected under the control of the system controller 14. Then, the process proceeds to step ST62.

In step ST62, the parameters of the correction signal CS are adjusted. For example, the parameters of the correction signal CS are adjusted by applying the processes described in the flowcharts illustrated in FIGS. 5 and 8 to 11. Then, the process proceeds to step ST63.

In step ST63, a process of returning the reading speed of the CMOS image sensor 12 to the original (setting the reading speed to the high speed) is performed under the control of the system controller 14 after the adjustment of the parameters of the correction signal CS is completed. Then, the actual photographing is performed. In the process of the actual photographing, the flickering correction is performed with the correction signal CS based on the adjusted parameters.

Note that the reading speed of the CMOS image sensor 12 at the time of the adjustment of the parameters of the correction signal CS is different from the reading speed of the CMOS image sensor 12 in the actual photographing. Accordingly, at the time of the flickering correction in the actual photographing, a process of fitting at least the phase is performed and a timing at which the flickering component is multiplied by an inverse gain is appropriately adjusted using the correction signal CS.

In the above-described sixth operation example, even in a case in which the actual photographing is performed at a high speed, the reading speed of the CMOS image sensor is lowered. Therefore, it is easy to detect the flickering component. Even in a frame rate at which automatic flickering correction of the related art is difficult, it is possible to improve the effect of the flickering correction.

Seventh Operation Example

Next, a seventh operation example will be described. The seventh operation example is an example in which a flickering correction process and a flickering detection process are performed while a predetermined manipulation is performed, and the parameters of the correction signal CS is automatically optimized on the basis of the result. The predetermined manipulation is, for example, a manipulation of pushing one button included in the manipulation unit 18*a*. While the button is pushed, the parameters of the correction signal CS are automatically optimized. Hereinafter, a mode in which this process is performed is appropriately referred to as one-push flickering correction.

Figure 13:
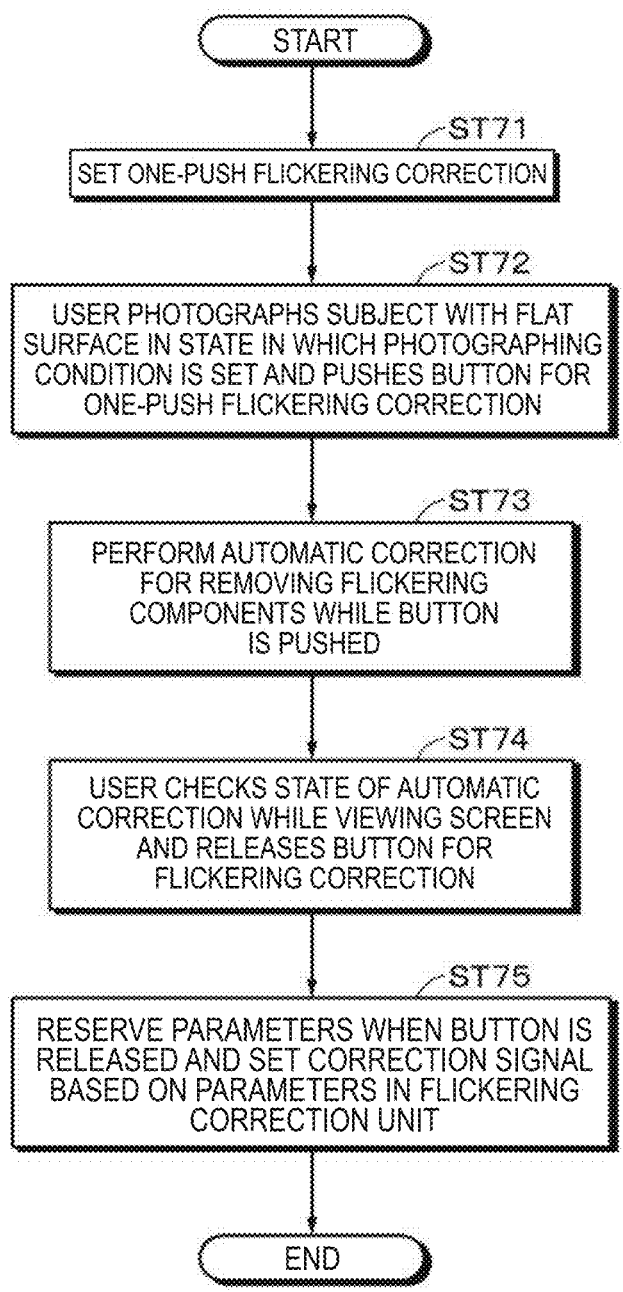
FIG. 13 is a flowchart illustrating a flow of a process in the seventh operation example.

FIG. 13 is a flowchart illustrating a flow of a process in the seventh operation example. Note that the process to be described below is performed at the preparation stage preceding the actual photographing (the stage before the imaging starts). When the process starts, the one-push flickering correction is set as a mode in step ST71. Then, the process proceeds to step ST72.

In step ST72, a flat subject with a single color is photographed in a state in which a photographing condition is set (for example, the imaging device 100 is placed under a flickering light source). For example, white paper prepared in advance is photographed. The photographing target may be color other than white, red, or the like or may be a wall. An image of the white paper including flickering is displayed on the display unit 18*b*. In this state, a button for the one-push flickering correction is pushed. Then, the process proceeds to step ST73.

In step ST73, the flickering correction for removing the flickering components is automatically preformed while the button is pushed. Specifically, an input image signal including the flickering components is input and each process is performed on the input image signal in the clamp circuit 21, the gain adjustment circuit 22, and the white balance adjustment circuit 23. Then, the flickering correction unit 24 performs the flickering correction process on the input image signal subjected to each process. At this time, the flickering correction unit 24 performs the flickering correction process with the preset correction signal CS. Then, the image signal subjected to the flickering correction process is input to the flickering detection unit 25.

The flickering detection unit 25 detects whether or not the flickering components are included in an input image. Then, the result is supplied from the flickering detection unit 25 to the system controller 14. The system controller 14 automatically adjusts the parameters of the correction signal CS on the basis of the detection result of the flickering supplied from the flickering detection unit 25. That is, a feedback loop in which the flickering components included in the image are detected while the button is pushed and the parameters of the correction signal CS are automatically adjusted on the basis of the detection result is formed. Thus, the parameters of the correction signal CS are optimized. Then, the process proceeds to step ST74.

In step ST74, the user checks the automatic correction state while viewing the display unit 18*b*. With the optimization of the parameters of the correction signal CS, striped flickering of the image displayed on the display unit 18*b* gradually disappears. Then, when the flickering of the image disappears, the user stops the manipulation of pushing the button and releases the button. Then, the process proceeds to step ST75.

In step ST75, the parameters when the manipulation of releasing the button is performed are reserved (stored) and the correction signal CS based on the parameters is set in the flickering correction unit 24. Then, in the actual photographing, the flickering correction process based on the set correction signal CS is performed.

In the above-described seventh operation example, it is possible to optimize the parameters of the correction signal without being conscious that the user performs erroneous correction or overcorrection in the flickering correction through, for example, a simple manipulation of continuously pushing the button or the like. In addition, the user can check that the flickering components are removed.

Eighth Operation Example

Figure 14:
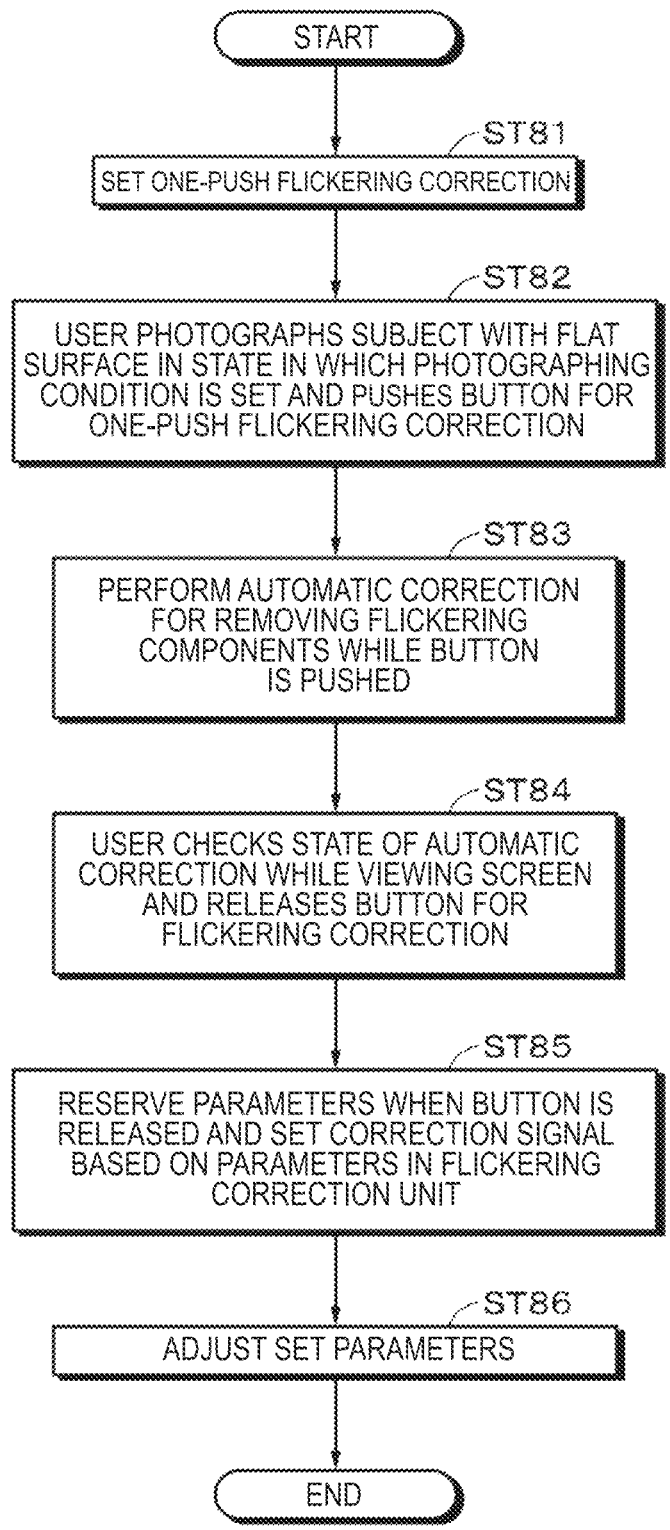
FIG. 14 is a flowchart illustrating a flow of a process in the eighth operation example.

Next, an eighth operation example will be described. FIG. 14 is a flowchart illustrating a flow of a process in the eighth operation example. Note that the process to be described below is performed at the preparation stage preceding the actual photographing (the stage before the imaging starts).

Processes of steps ST81 to ST85 are the same as the processes of steps ST71 to ST75 in the seventh operation example. That is, the parameters of the correction signal CS are optimized through the one-push flickering correction. After the process of step ST85, the process proceeds to step ST86.

In step ST86, the parameters of the correction signal CS set in the flickering correction unit 24 are considered to be adjustable. For example, the parameters of the correction signal CS is adjusted in accordance with the mode of the manual flickering correction described in the first operation example. The parameters of the correction signal CS may be adjusted through the processes described in any of the other operation examples. The flickering correction process in the actual photographing is performed in accordance with the correction signal CS based on the adjusted parameters.

In the above-described eighth operation example, it is possible to obtain advantageous effects similar to the advantageous effects exemplified in the seventh operation example. In addition, in the eighth operation example, the user can adjust the automatically optimized parameters of the correction signal again.

Note that in the seventh and eighth operation examples, the button may be released at a stage meanwhile before the flickering completely disappears. Thus, the user can adjust the degree of strength (intensity) of the flickering correction. For example, it is possible to adjust the intensity of the flickering correction for each scene or in accordance with a frame rate.

In addition, for example, in response to a manipulation of pushing the button once rather than the manipulation of continuously pushing the button, the control in which the parameters of the correction signal are optimized, as described in the seventh and eighth operation examples may be performed.

Ninth Operation Example

Next, a ninth operation example will be described. In the ninth operation example, a movable range is set the parameters of the correction signal CS after the adjustment. Then, in the actual photographing, a flickering correction process is performed while the parameters of the correction signal CS is automatically adjusted within a range of the removable range. Hereinafter, a mode in which this process is performed is appropriately referred to as semi-automatic correction.

FIG. 15 is a flowchart illustrating a flow of a process in the ninth operation example. In step ST91, the semi-automatic correction is set as a mode. Then, the process proceeds to step ST92.

In step ST92, the parameters of the correction signal CS are adjusted. For example, the parameters are adjusted through a manual manipulation by the user, as described in the first operation example. The parameters may be adjusted through the processes described in any of the other operation examples. Then, the movable range of the parameters is set for the parameters after the adjustment. The setting of the movable range of the parameters may be performed through a manual manipulation by the user or may be performed automatically. As the movable range, for example, a frequency of ±5 Hz. a phase of ±5 degrees, an amplitude of 0.8 times to 1.2 times (dB display may be used), or the like is set. Then, the process proceeds to step ST93.

In step ST93, after the user turns on the semi-automatic correction, the actual photographing is performed. Then, the process proceeds to step ST94.

In step ST94, parameters are dynamically changed within the movable range by setting the parameters after the adjustment as a center. That is, the flickering detection process is performed on an input image obtained in the actual photographing. In a case in which flickering components are detected, the system controller 14 minutely adjusts the parameters of the correction signal CS within the movable range in accordance with a temporal change of an environment. The temporal change of the environment is a change in a photographing environment caused over time and means jitter of the flickering components in this example. Then, the correction signal CS in a case in which no flickering is detected is the correction signal CS set finally in the flickering correction unit 24.

Note that the process of step ST94 is performed in real time in a case in which a moving image is obtained in the actual photographing. In a case in which a still image is obtained in the actual photographing, the still image is temporarily stored in a memory or the like and the process of step ST94 is appropriately repeated using the image stored in the memory.

In the above-described ninth operation example, the parameters of the correction signal can be adjusted in the preparation stage preceding the actual photographing (the stage before the imaging starts). In addition, even in a case in which the parameters of the correction signal are set once, the parameters are minutely adjusted within the movable range. Therefore, the parameters of the correction signal can be caused to follow the temporal change (jitter) of the flickering components, and thus appropriate flickering correction can be performed.

In addition, the movable range of the parameters is set and the range in which the parameters are adjusted is restricted. For example, when a subject has a horizontally striped shape such as a crosswalk or a clothing pattern, there is concern of the shapes being erroneously recognized as flickering and the parameters being adjusted without restriction so that a pattern with a horizontally striped shape is removed. However, when the movable range is set, the parameters can be prevented from being adjusted without restriction, and thus the pattern with the horizontally striped shape can be prevented from being erroneously recognized as flickering and corrected.

2. Modification Examples

Additionally, the present technology may also be configured as below.

(1)

An imaging control device including:

a control unit that is able to adjust a parameter of a correction signal for correcting a flickering component included in a captured image before imaging of the captured image starts.

(2)

The imaging control device according to (1), including:

a flickering correction unit configured to correct a flickering component on the basis of the correction signal.

(3)

The imaging control device according to (2), including:

a flickering detection unit configured to detect a flickering component included in an image output from the flickering correction unit.

(4)

The imaging control device according to (3), in which the control unit performs control such that a display unit is caused to perform display based on a detection result by the flickering detection unit.

(5)

The imaging control device according to any of (1) to (4), in which the control unit is able to adjust the parameter for each color.

(6)

The imaging control device according to (5), in which the control unit performs control such that the parameter related to a predetermined color is applied as a parameter of another color.

(7)

The imaging control device according to (5), in which the control unit is able to adjust a parameter of another color on the basis of the parameter related to a predetermined color after adjustment.

(8)

The imaging control device according to any of (1) to (7), in which the control unit performs control such that a frame rate is changed before and after the imaging starts.

(9)

The imaging control device according to any of (1) to (8), including:

an input unit configured to adjust the parameter.

(10)

The imaging control device according to any of (1) to (9), in which the control unit performs control such that an adjustment screen for adjusting the parameter is caused to be displayed on a display unit.

(11)

The imaging control device according to (10), in which the control unit performs control such that the adjustment screen is caused to be displayed on the display unit along with an image obtained via an imaging unit.

(12)

The imaging control device according to any of (1) to (11), in which the control unit performs control such that the parameter of the correction signal is adjusted to be optimized in response to a predetermined manipulation.

(13)

The imaging control device according to (2), in which the flickering correction unit corrects the flickering component by a correction signal based on the parameter after adjustment in actual photographing.

(14)

The imaging control device according to (2), in which a movable range of the parameter is set, and the flickering correction unit corrects the flickering component by a correction signal for causing a parameter after the adjustment to be changed within the movable range.

(15)

The imaging control device according to any of (1) to (14), in which the parameter is at least one of a frequency, a phase, an amplitude, or a waveform shape of the correction signal.

(16)

The imaging control device according to any of (1) to (15), including:

an imaging unit.

(17)

The imaging control device according to any of (1) to (16), in which a stage before the imaging starts is a preparation stage preceding actual photographing.

(18)

The imaging control device according to any of (1) to (17), in which the actual photographing is photographing in which the photographed image is recorded on a recording medium and the preparation stage is a stage before a manipulation of instructing the actual photographing is performed after a subject is accepted via an imaging unit.

(19)

An imaging control method including:

adjusting, by a control unit, a parameter of a correction signal for correcting a flickering component included in a captured image before imaging of the captured image starts.

(20)

An imaging system including:

an imaging unit;

a control unit that is able to adjust a parameter of a correction signal for correcting a flickering component included in a captured image before imaging of the captured image starts;

a flickering correction unit configured to perform correction based on the correction signal on the captured image; and a display unit configured to display the corrected image.

The embodiments of the present disclosure have been described above specifically, but the present disclosure is not limited to each of the above-described embodiments and various modifications based on the technical spirit of the present disclosure can be made. For example, the configurations, the methods, the processes, the shapes, the materials, the numerical values, and the like exemplified in the above-described embodiments are merely exemplary and different configurations, methods, processes, shapes, materials, numerical values, and the like may be used as necessary. Configurations for realizing the above-described embodiments and the modification examples may be appropriately added.

The processes or the modes in the above-described plurality of operation examples may be combined and processes appropriate for each operation example may be added. For example, in a case in which high-speed photographing is performed and a case in which the one-push correction is set as a mode, a process of changing the reading speed of the CMOS image sensor 12 to be slowed may be performed while the button for the one-push correction is pushed. In addition, in the seventh operation example, the fact that the flickering disappears may be reported to the user through display or the like.

The correction signal obtained in each operation example or the parameters of the correction signal may be stored in a storage device. Then, the corresponding parameters may be read from the storage device to be set in photographing at the same location some day. Thus, it is not necessary to set the parameters individually in detail. In addition, the parameters of the correction signal may be considered to be able to be transmitted to another photographing device through communication and the parameters may be shared and used.

The flickering light source is not limited to a fluorescent lamp and an LED may be used. Any source that blinks at a certain period may be used.

In the imaging device according to the above-described one embodiment, a mode in which the flickering correction is performed in accordance with a method similar to that of the related art may be considered to be selectable.

A target image on which the flickering correction is performed is not limited to an image obtained via the imaging unit and may be an image stored in a storage device or an image obtained on the Internet or through short-range communication.

The imaging device according to the above-described embodiments may be embedded in a medical device such as a microscope, a smartphone, a computer device, a game device, a robot, a surveillance camera, a moving object (a vehicle, a train, an airplane, a helicopter, a small flight body, or the like).

The units included in the above-described imaging device may not necessarily be integrated as an imaging device or may be included in devices in which some of the configurations are independent. For example, the present disclosure can also be realized as a controller (imaging control device) that includes the system controller 14. In addition, for example, the display unit may be an independent device as a display device. A control command or data in each device are exchanged through wired or wireless communication. In this way, the present disclosure can also be realized as an imaging system including a plurality of devices. In addition, the present disclosure may be realized in accordance with another method, program, or the like. In addition, since a manipulation is necessary in the preparation stage, the present disclosure is preferably applied to an imaging device for business or the like and can also be applied to an imaging device for consumer use or the like.

REFERENCE SIGNS LIST 11 imaging optical system
12 CMOS image sensor
14 system controller
18a manipulation unit
18b display unit
20 digital signal processing unit
23 white balance adjustment circuit
24 flickering correction unit
25 flickering detection unit
100 imaging device

The invention claimed is:

1. An imaging control device, comprising:
a control unit configured to:
adjust a parameter of a correction signal for correction of a first flickering component included in a captured image, wherein
the parameter of the correction signal is adjusted based on a user input for the adjustment of the parameter of the correction signal, and
the user input is received before start of an imaging operation of the captured image; and
generate the correction signal for the correction of the first flickering component included in the captured image based on the adjusted parameter of the correction signal; and
a flickering correction unit configured to correct the first flickering component included in the captured image based on the generated correction signal.

2. The imaging control device according to claim 1, further comprising:
a flickering detection unit configured to detect a second flickering component included in an image output from the flickering correction unit after the correction of the first flickering component.

3. The imaging control device according to claim 2, wherein the control unit is further configured to control such that a display unit to display a result of the detection of the second flickering component by the flickering detection unit.

4. The imaging control device according to claim 1, wherein the control unit is further configured to adjust the parameter of the correction signal for each color of a plurality of colors of the captured image.

5. The imaging control device according to claim 4, wherein the control unit is further configured to set the parameter of the correction signal for a first color of the plurality of colors as the parameter of the correction signal for a second color of the plurality of colors.

6. The imaging control device according to claim 4, wherein the control unit is further configured to adjust the parameter of the correction signal for a second color of the plurality of colors based on the parameter of the correction signal for a first color of the plurality of colors after adjustment.

7. The imaging control device according to claim 1, wherein the control unit performs is further configured to change a frame rate of an image sensor before the start of the imaging operation and after the start of the imaging operation.

8. The imaging control device according to claim 1, further comprising an input unit configured to receive the user input for the adjustment of the parameter of the correction signal.

9. The imaging control device according to claim 1, wherein
the control unit is further configured to control a display unit to display an adjustment screen, and
the adjustment screen is displayed to receive the user input for the adjustment of the parameter.

10. The imaging control device according to claim 9, wherein
the control unit is further configured to control the display unit to display the adjustment screen along with the captured image obtained via an imaging unit.

11. The imaging control device according to claim 1, wherein
the control unit is further configured to adjust the parameter of the correction signal to optimize the parameter of the correction signal, and
the parameter of the correction signal is optimized based on a user manipulation.

12. The imaging control device according to claim 1, wherein
the flickering correction unit is further configured to correct the first flickering component based on the adjusted parameter in actual photographing.

13. The imaging control device according to claim 1, wherein
a movable range of the parameter is set,
the parameter of the correction signal after the adjustment is changeable within the set movable range of the parameter, and
the flickering correction unit is further configured to correct the first flickering component a based on the correction signal with the parameter adjusted within the set movable range of the parameter.

14. The imaging control device according to claim 1, wherein the parameter is at least one of a frequency, a phase, an amplitude, or a waveform shape of the correction signal.

15. The imaging control device according to claim 1, further comprising an imaging unit.

16. The imaging control device according to claim 1, wherein
a stage before the start of the imaging operation is a preparation stage, and
the preparation stage precedes an actual photographing stage.

17. The imaging control device according to claim 16, wherein
in the actual photographing stage the captured image is recorded on a recording medium,
the preparation stage is a stage before a manipulation of instructing instruction of actual photographing is performed, and
the manipulation of the instruction of the actual photographing is performed after a subject is accepted via an imaging unit.

18. An imaging control method, comprising:
adjusting, by a control unit, a parameter of a correction signal for correction of a flickering component included in a captured image, wherein
the parameter of the correction signal is adjusted based on a user input for the adjustment of the parameter of the correction signal, and
the user input is received before start of an imaging operation of the captured image;
generating, by the control unit, the correction signal for the correction of the flickering component included in the captured image based on the adjusted parameter of the correction signal; and
correcting, by a flickering correction unit, the flickering component included in the captured image based on the generated correction signal.

19. An imaging system, comprising:
an imaging unit configured to capture an image;
a control unit configured to:
adjust a parameter of a correction signal for correction of a flickering component included in the captured image, wherein
the parameter of the correction signal is adjusted based on a user input for the adjustment of the parameter of the correction signal, and
the user input is received before start of an imaging operation of the captured image; and
generate the correction signal for the correction of the flickering component included in the captured image based on the adjusted parameter of the correction signal;
a flickering correction unit configured to correct the flickering component included in the captured image based on the generated correction signal; and
a display unit configured to display a corrected image obtained based on the correction of the flickering component included in the captured image.

* * * * *